United States Patent [19]

Riggs et al.

[11] 4,454,753

[45] Jun. 19, 1984

[54] DIFFUSER/EJECTOR SYSTEM FOR A VERY HIGH VACUUM ENVIRONMENT

[75] Inventors: Kenneth E. Riggs, Huntsville; Carl J. Wojciechowski, Harvest, both of Ala.

[73] Assignee: The United States of America as represented by the Administrator of the National Aeronautics and Space Administration, Washington, D.C.

[21] Appl. No.: 409,678

[22] Filed: Aug. 19, 1982

[51] Int. Cl.³ ........................................... G01M 15/00
[52] U.S. Cl. .................................... 73/117.1; 417/159
[58] Field of Search ................ 73/116, 117.1, 432 SD; 417/159

[56] References Cited

U.S. PATENT DOCUMENTS 2,939,316  6/1960  Beecher et al. .................... 73/117.1
3,015,231  1/1962  Ganahl ............................... 73/117.1

FOREIGN PATENT DOCUMENTS 808514  2/1959  United Kingdom ............... 73/117.1

*Primary Examiner*—Jerry W. Myracle
*Attorney, Agent, or Firm*—Joseph H. Beumer; John R. Manning; Leon D. Wofford, Jr.

[57] ABSTRACT

A system for testing space engines at sea level under a very low pressure environment. The system includes a space simulation chamber connected to a diffuser which has two variable area ratio ejectors connected to it in tandem. Each of the ejectors is driven by a jet engine, preferably a turbo jet. The system is capable of providing a low pressure environment of about three or four millimeters of mercury for testing of engines mounted in the space simulation chamber. The system also may be used for other purposes requiring very high vacuum, such as evaporation and dehydration of food products or drugs.

16 Claims, 7 Drawing Figures

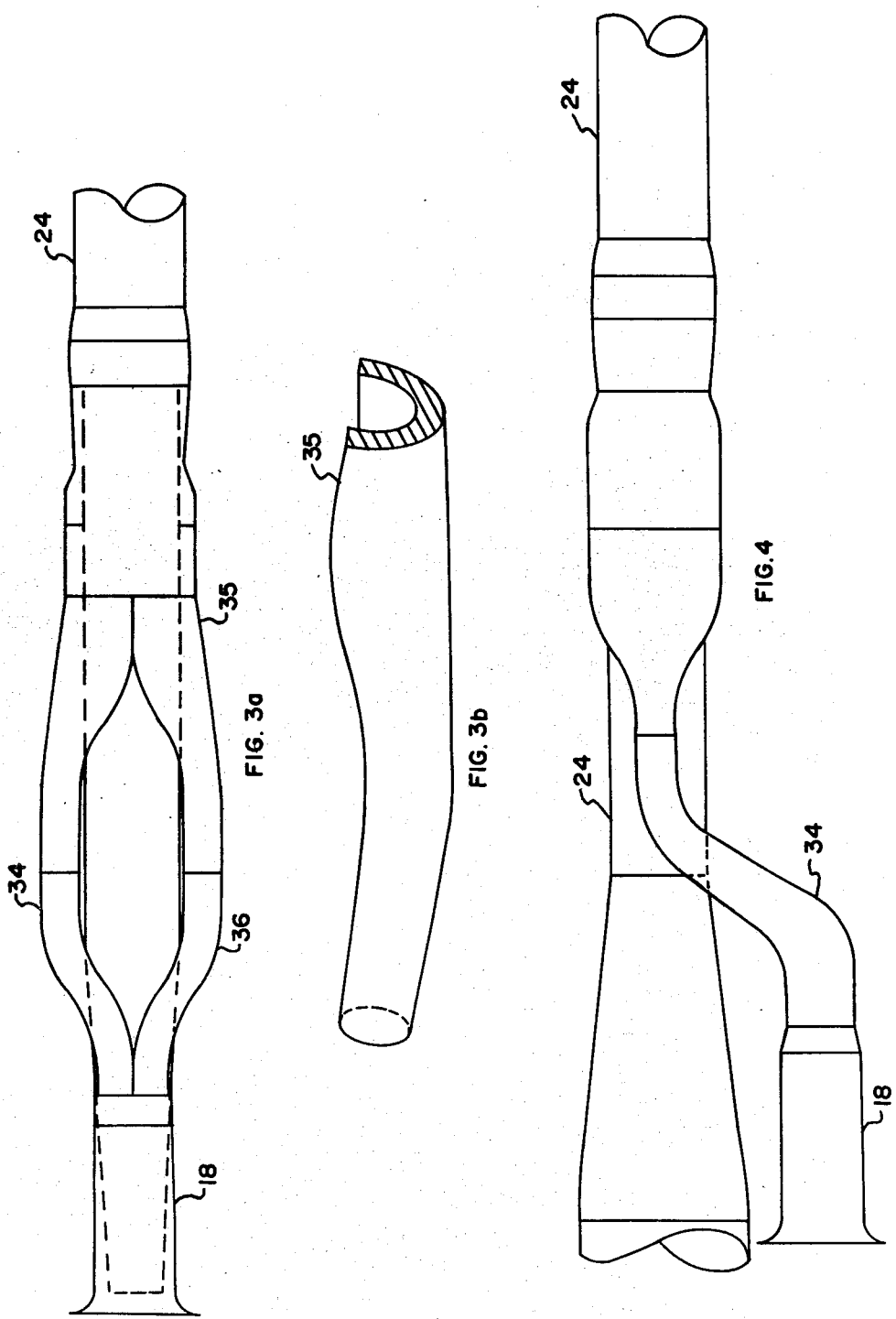

DIFFUSER/EJECTOR SYSTEM FOR A VERY HIGH VACUUM ENVIRONMENT

ORIGIN OF THE INVENTION

The invention described herein was made in the performance of work under a NASA contract and is subject to the provisions of Section 305 of the National Aeronautics and Space Act of 1958, Public Law 85-568 (72 Stat. 435; 42 U.S.C. 2457).

TECHNICAL FIELD

The present invention relates generally to large vacuum pumps, and more particularly to a method and apparatus for testing space engines at sea level. Specifically, the invention is for testing space engines at sea level under a simulated space environment.

BACKGROUND OF THE INVENTION

In the past, the National Aeronautics and Space Administration has conducted short duration tests of space engines and control thrusters using steam-driven ejector systems (at about 10 mm of mercury vacuum), an example of which is disclosed in U.S. Pat. No. 2,939,316 to Beecher et al. These systems have worked well in the past in providing a low pressure environment simulating conditions space engines will encounter in low earth orbit.

At the present time, NASA has a requirement for a test system to perform long duration sea level testing of a whole family of ultra-high expansion ratio space engines operating at simulated space conditions. Most of these engines have a nozzle area ratio (ratio of exit area to throat area) of between 200:1 and 650:1. Ideally, however, such a system should be able to accommodate rocket engines with nozzle area ratios up to 2,000:1. In addition, the system should be able to accommodate the testing of space engines at 10% power levels with chamber pressures as low as 40 PSIA. Run times should be 30 minutes or longer. Testing of modern space engines requires a test environment having a pressure equivalent to three or four millimeters of mercury. As a practical matter, the type of space engines described above cannot readily be tested by steam systems because of cost, time and facility size requirements.

Another prior art patent is U.S. Pat. No. 2,763,155 to Beams et al. This is an early system for simulating high altitude conditions in order to test hydrocarbon/air combustion under such conditions. Beams et al discloses a two-stage ejector system having a first ejector with a large nozzle fed from its large outlet conduit and a second ejector having a small nozzle fed from a branch conduit which connects with the main conduit directly adjacent to the first ejector nozzle. While the Beams et al device may have been useful in the 1950's in early experimental work relating to combustion at high altitudes, it did not contemplate and did not provide a system actually capable of long duration testing of space engines at sea level. It has an ejector arrangement of doubtful efficiency and does not provide a system capable of being upsized or upgraded to test large modern space engines. Moreover, it does not envision or provide a way to adjust flow rate, and it does not provide a complete test system including a space simulation chamber for receiving space engines to be tested.

Therefore, the object of this invention is to develop a system providing a large high vacuum environment for testing space engines of the type mentioned above, such system being reliable and comparatively inexpensive in construction and operation costs.

SUMMARY OF THE INVENTION

The present invention is a jet engine-driven diffuser/ejector system which is only one-fifth the initial investment and one-tenth the operational cost (conservatively) of a steam ejector system having the same capability. The jet engine ejector is capable of near instantaneous start-up time as compared with the steam system. The present invention is capable of handling a wide range of space engines in terms of the engine chamber pressure and area ratio which the invention will handle in several ways as follows:

(A) no augmentation required for space engine operation;
(B) single stage ejector required for space engine operation; and
(C) multiple stage ejector required for space engine operation.

The system of the present invention comprises a space simulation chamber for mounting of a space engine to be tested, a diffuser connected to the space simulation chamber, an ejector connected to the diffuser, and a jet engine directly connected to the ejector for creating a high vacuum environment in the diffuser.

BRIEF DESCRIPTION OF THE DRAWINGS

A presently preferred embodiment of the invention will now be described in detail in connection with the accompanying drawings, wherein:

FIG. 3a is a side view of the jet engine-to-diffuser duct transition.

FIG. 3b is an enlarged portion of the duct shown in FIG. 3a.

FIG. 4 is a top view of the jet engine-to-diffuser duct transition.

DETAILED DESCRIPTION OF THE INVENTION

Figure 1:
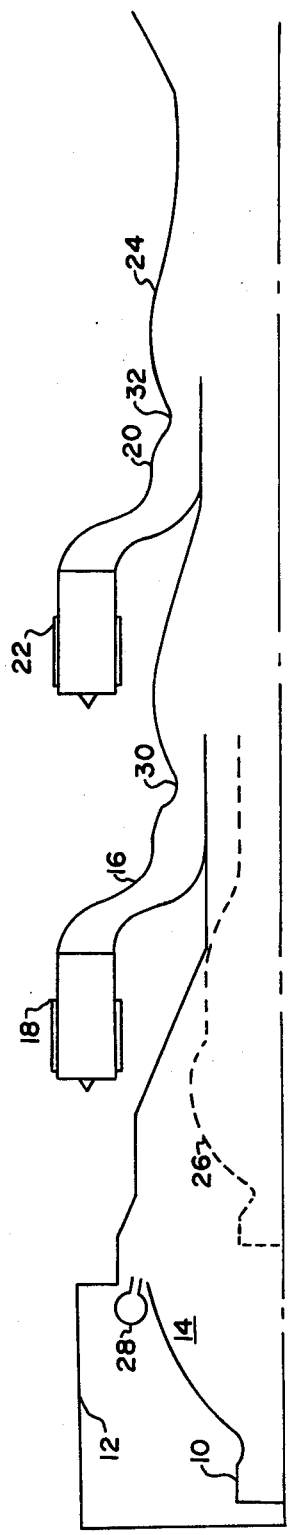
FIG. 1 is a pictorial diagram of the invention, not to scale.

FIG. 1 shows a preferred embodiment of the present invention. A rocket engine 10, having a nozzle area ratio of about 205, is under test in a space simulation chamber 12. Downstream from the rocket engine exhaust 14 is a first stage ejector 16 having directly connected to it a jet engine 18 that provides a high temperature mass flow equivalent of approximately the mass flow of the test article. Further downstream and in tandem with first ejector stage 16 is a second stage 20 having directly connected to it a jet engine 22 with a high temperature mass flow equivalent of approximately nine times the mass flow of the test article. Jet engines 18 and 22 are preferably turbo jets since this type of engine has the necessary capability to generate high temperature, high volume medium pressure gas and is available at comparatively low cost. Both ejectors 16 and 20 connect directly into diffuser 24. To illustrate that the invention can accommodate a whole family of space engines, the location of a different type space engine having a nozzle area ratio of about 650 is shown diagrammatically by the dotted lines at 26. As a safety factor, a source of pressurized inert gas 28, such as nitrogen or argon, is installed in the area adjacent to the rocket engine nozzle 14. This purge source clears the space simulation chamber and diffuser of any combustible gas mixture resulting from a fuel lead or leak which might possibly cause a detonation on start-up. The inert gas purge system is operated at the required capacity during start-up and shutdown of the test system disclosed herein and is cut back to an operating level during the actual operational testing of a space engine.

First stage ejector 16 and second stage ejector 20 are each equipped with a variable area ratio ejector 30 and 32, respectively. The area ratio of the ejector is the ratio of the exit area to the throat area of the ejector. Exit areas 30 and 32 are made variable through the use of an outer cone which translates (FIG. 5) with respect to an inner cone at the ejector nozzle. The area ratios can be continuously and automatically adjusted during operations to maintain an ejector exit pressure balance with the main duct flow as required.

Figure 2:
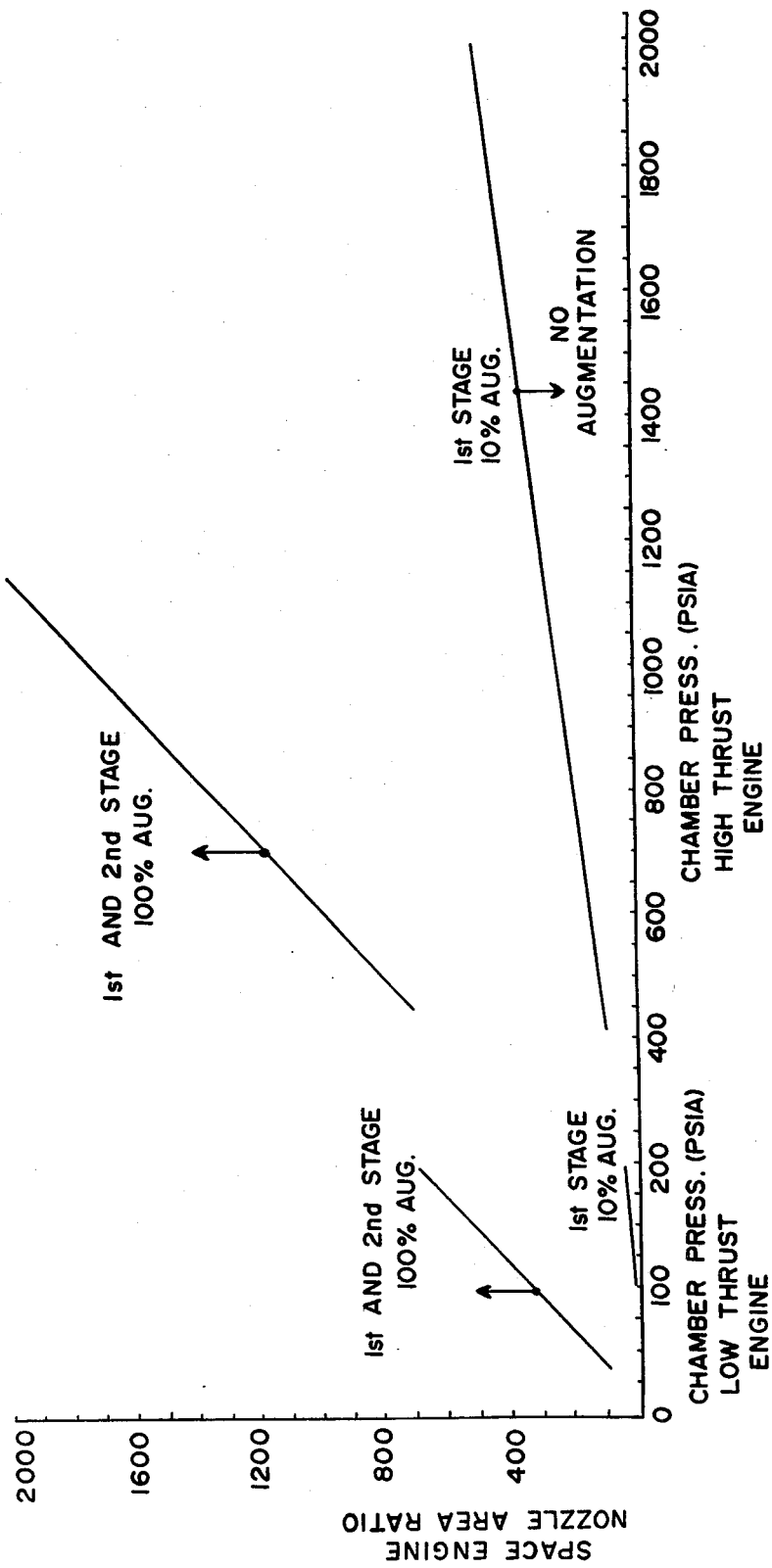
FIG. 2 is a graph showing limits of diffuser augmentation required in terms of chamber pressure and space engine nozzle area ratios.

FIG. 2 shows a space engine operational envelope for the jet engine driven diffuser/ejector system. The graph resulted from a parametric analysis performed to define a particular diffuser operational envelope in terms of diffuser augmentation, space engine nozzle area ratio and chamber pressure. It will be noted that the graph shows the envelope for both low thrust engines and high thrust engines. Nozzle area ratios up to a maximum of 2,000:1 are plotted against chamber pressures up to a maximum of 2,000 PSIA.

FIGS. 3a and 4 show the side view and top view, respectively, of the jet engine-to-diffuser duct transition. By reference to FIGS. 3a, 3b and 4, it may be seen that the jet engine 18 for the first ejector stage has two ducts, 34 and 36, leading into the diffuser. Duct 34 leads into the top of the diffuser, while duct 36 leads into the bottom of the diffuser. A portion of duct 36, which is designated by numeral 35, is shown enlarged in FIG. 3b. As seen best in FIGS. 3a, 3b and 4, jet engine 18 is located to the side of diffuser 24 and at about the same height. Jet engine 22 has a similar jet engine-to-diffuser transition.

Figure 5:
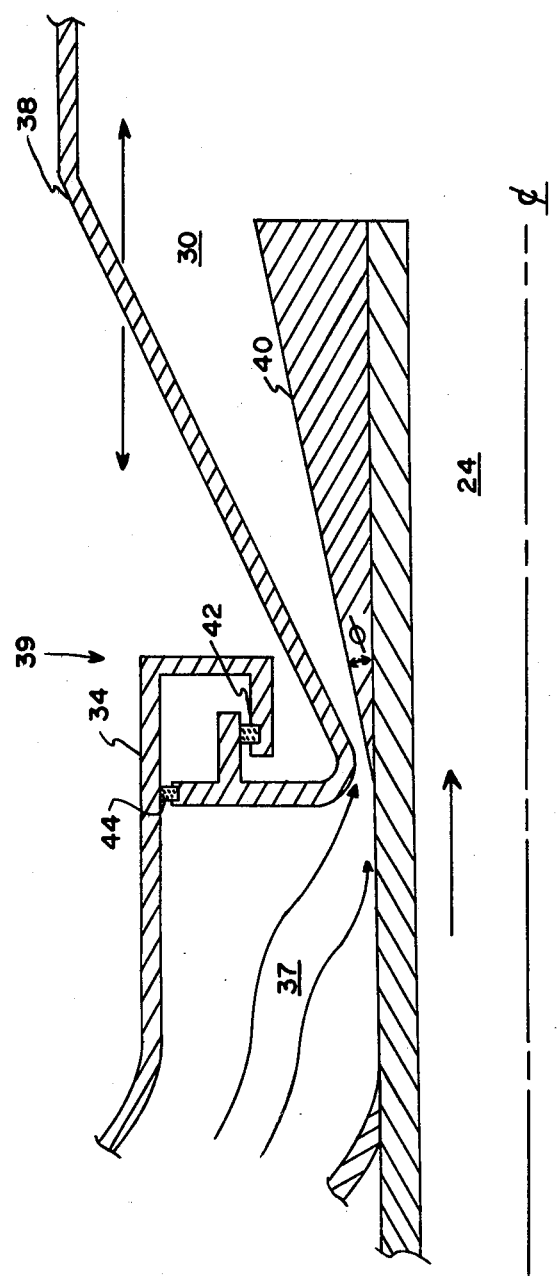
FIG. 5 is a cross-sectional view showing the mechanical arrangement of the variable area ratio ejector.

FIG. 5 shows the arrangement of the variable area ratio ejectors 30 and 32 (FIG. 1). In order to adjust the flow rate in the jet engine-to-diffuser transition ducts 34 and 36 (FIG. 3a), the exit area 30 of first ejector 16 to the diffuser 24 (FIG. 1) is equipped with a control mechanism 39 (FIG. 5) having an outer cone 38 which translates longitudinally (or fore and aft) with respect to inner cone 40, which is fixed. Seals 42 and 44 prevent the escape of hot gases from the jet engine. In addition to the variable area ratio which may be achieved by translation of outer cone 38 longitudinally, additional ejector area ratio variation is achieved by using a family of cones 40 having varying angles of taper $\theta$ and interchanging cones 40 as desired.

Figure 6:
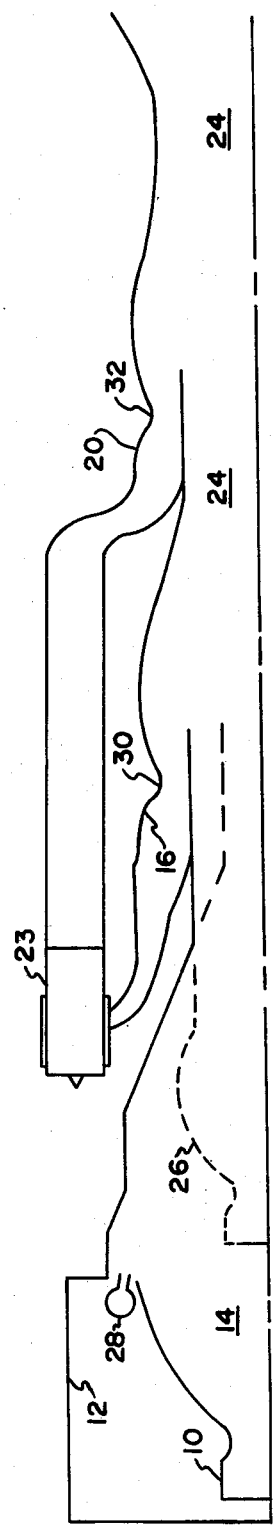
FIG. 6 is a pictorial diagram of an alternative arrangement of the invention, not to scale.

An alternative arrangement of the invention is shown in FIG. 6. In this arrangement, one large jet engine 23 drives both ejectors 16 and 20. First stage ejector 16, instead of being driven by a small jet engine, is driven by compressor bleed air from the large jet engine 23. Obviously, this arrangement is only possible when the driving requirements for the two ejectors are within the capability of one large jet engine.

Going now to the operation of the preferred embodiment of the system, as shown in FIG. 1, a space engine is first installed and securely fastened down in the space simulation chamber with the space engine exhaust directed into the diffuser. The inert gas purge system is then turned on at required capacity in order to pump the inert gas into the diffuser downstream from the space engine exhaust. The two jet engines connected to the first and second ejector stage, respectively, are then started up in sequence at idle power and then advanced simultaneously to full power. The inert gas purge system is then cut back to its operating level. When the required vacuum level of approximately three or four millimeters of mercury is reached, the space engine is then started. After advancing the space engine to whatever power level is desired, the second ejector engines throttled back if only one ejector is required. The space engine is then operated for the desired run time up to 30 minutes or more.

For a shutdown of the diffuser system, the second ejector jet engine is again throttled up to full revolutions, if necessary, and the inert gas purge system is turned up to the required capacity before the space engine is shut down. After that, the first and second ejector stage engines are both shut down simultaneously. Lastly, the inert gas purge system is shut down.

The invention described above provides a new method and apparatus for a diffuser system for sea level testing of high expansion ratio space engines. By using turbo jet engines, we can provide the same very low pressure environment at about one-fifth the initial investment and one-tenth the operating costs of a more conventional steam system. Moreover, the jet engine ejector system has the following other advantages: (1) large diffuser operational envelope; (2) extremely long space engine run time; (3) almost instantaneous start-up time; and (4) minimum maintenance.

This system is applicable to any operation which requires a high vacuum system. It could be especially useful in providing a very high vacuum for the handling of crude oil or other dirty or corrosive liquids. The system could see large future application in many industrial processes, such as (1) handling corrosive fumes, (2) large vacuum pump, (3) evaporation of milk and fruit juices, (4) petroleum distillation-fractioning columns and towers, (5) pharmaceutical-distillation of certain oils, and (6) dehydration of blood plasma and penicillin.

We claim:

1. A diffuser system for testing space engines comprising:

a space simulation chamber having an area for the mounting of a space engine to be tested;

a diffuser operatively connected to said space simulation chamber downstream from said mounting area;

an ejector operatively connected to said diffuser; and a jet engine directly connected to said ejector for creating a high vacuum environment in said diffuser.

2. A diffuser system for testing of space engines of claim 1 comprising:

a second ejector operatively connected to said diffuser downstream from said first ejector;

a second jet engine directly connected to said second ejector, said first and second jet engines being effective to create a very high vacuum environment in said diffuser.

3. A diffuser system for testing of space engines of claim 2 wherein said second jet engine is several times larger than said first jet engine.

4. A diffuser system for testing of space engines of claim 3 wherein said first and second jet engines are turbo jets.

5. A diffuser system for testing of space engines of claim 2 comprising an inert gas purge system operatively connected to said altitude chamber to prevent the possibility of detonation on start-up due to fuel lead or leak.

6. A diffuser system for testing of space engines of claim 2 wherein said first ejector and said second ejector both have variable area ratio outlets.

7. A diffuser system for testing of space engines of claim 6 wherein each of said first and second variable area ratio ejector outlets has an outer cone and an inner cone, said outer cone being arranged so that it translates longitudinally with respect to said inner cone.

8. A diffuser system for testing of space engines of claim 7 wherein said inner cones are interchangeable with other inner cones having varying angles of taper to provide additional variation in the ejector area ratio.

9. A diffuser system for testing of space engines of claim 8 wherein said second jet engine is several times larger than said first jet engine.

10. A diffuser system for testing of space engines of claim 9 wherein said first and second jet engines are turbo jets.

11. A diffuser system for testing of space engines of claim 10 comprising an inert gas purge system operatively connected to said space simulation chamber to prevent the possibility of detonation on start-up due to fuel lead or leak.

12. A diffuser system for testing of space engines of claim 1 comprising a second ejector operatively connected to said diffuser downstream from said first ejector.

13. A diffuser system for testing of space engines of claim 12 wherein said jet engine is also directly connected to said second ejector for creating a high vacuum environment in said diffuser.

14. A method of testing space engines comprising:
    placing a space engine in a space simulation chamber;
    connecting a diffuser to said simulation chamber;
    connecting two ejectors to said diffuser;
    connecting two jet engines to said two ejectors;
    starting said two jet engines and advancing them to full power;
    starting said space engine and advancing it to the desired power level;
    running said space engine for a predetermined time as required for the engine being tested;
    shutting down said space engine; and
    shutting down said jet engines.

15. A method of testing space engines of claim 14 comprising:
    starting up an inert gas purge system at required capacity before said jet engines are started;
    cutting back said inert gas purge system to an operating level after said jet engines have been started and advanced to full power;
    advancing said inert gas purge system to required capacity before said space engine is shut down; and
    shutting down said inert gas purge system after said jet engines are shut down.

16. A method of testing space engines of claim 15 comprising arranging said ejectors so that the ratio of the exit area to the throat area is variable.

* * * * *